April 18, 1950     H. A. WULFF     2,504,241
FISHLINE BOBBER
Filed Jan. 4, 1946
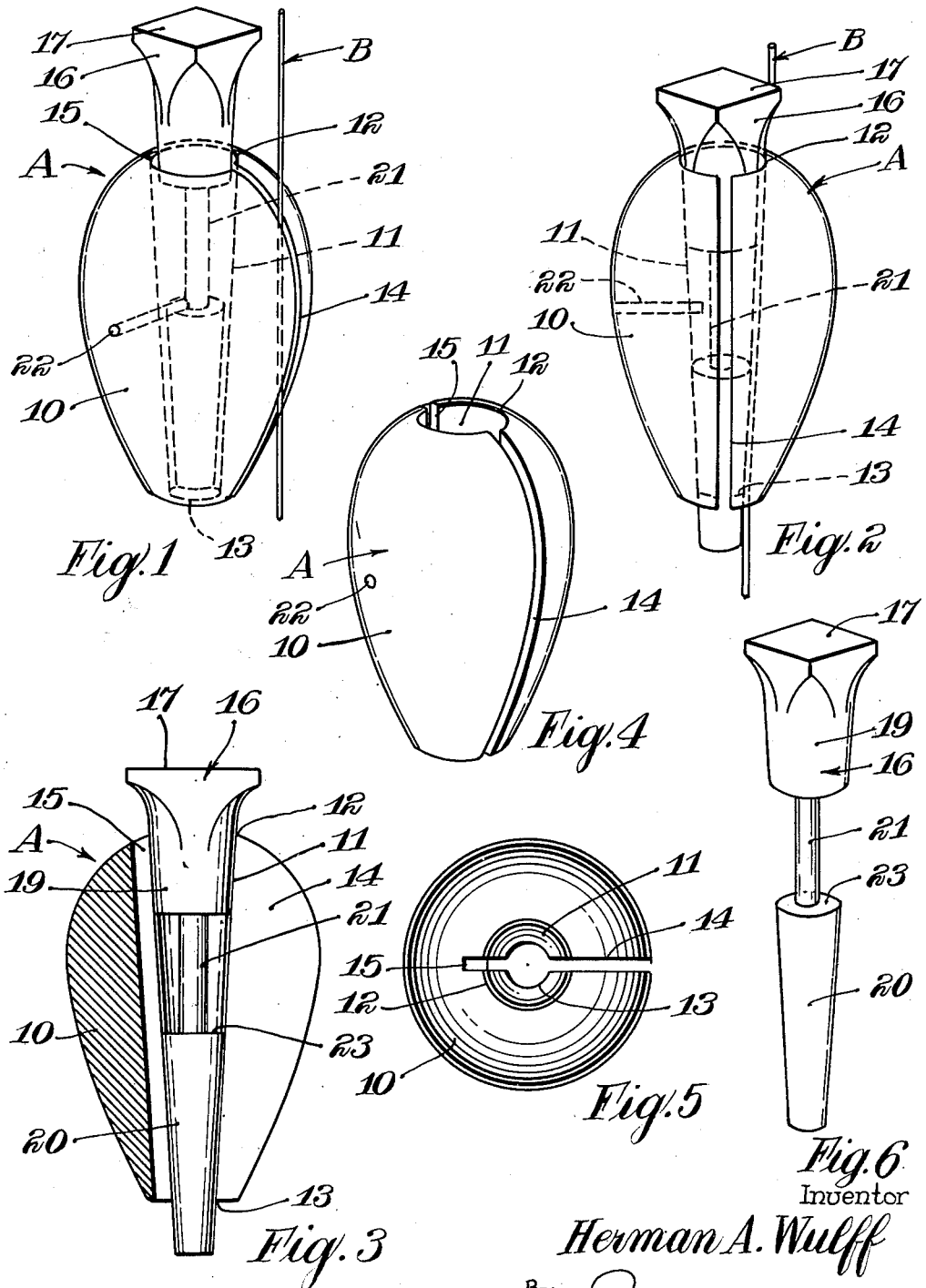
Inventor
Herman A. Wulff
By Robert M. Dunning
Attorney Patented Apr. 18, 1950

2,504,241

UNITED STATES PATENT OFFICE 2,504,241

FISHLINE BOBBER

Herman A. Wulff, St. Paul, Minn.

Application January 4, 1946, Serial No. 639,028

2 Claims. (Cl. 43—44.87)

My invention relates to an improvement in fish line bobber, wherein it is desired to provide a simple and effective bobber construction.

Various types of fish line bobbers, however, are difficult to attach to a fish line or require some time and effort to apply or adjust. The present construction is designed to obviate such previous difficulties and to present a structure which may be easily applied to a line and which may be adjusted with equal ease.

A feature of the present invention lies in the provision of a float body having a slot or groove therein into which a fish line may be inserted. A wedge device is provided to clamp the line in adjusted position after insertion into the groove. As a result the fish line may be easily attached to the bobber in any adjusted position.

A feature of the present invention resides in the provision of a fish line locking wedge which is movably supported by the bobber body. In one position the wedge allows free movement of the fish line relative to the bobber body. In another position the fish line is locked tightly to the bobber body.

A feature of the present invention resides in the provision of a bobber having a fish line locking means which is capable of accommodating lines of various thicknesses. In one position of the locking means a considerable space is provided between the locking means and the bobber body so that a line of considerable thickness can be accommodated. In locking the line to the bobber the wedge-shaped locking means is moved relative to the body and is operable to lock a line in place regardless of the size of the line.

A feature of the present invention resides in the fact that my bobber may be used for casting purposes in which case the fish line is slidably supported by the bobber. As a result the bobber may slide closely adjacent the hook or leader at the end of the fish line during the casting process and the line may then slide through the bobber for a predetermined distance. By placing a knot in the line at a desired distance from the hook end the length of line which may pass through the bobber may be limited to support a hook at a desired depth after the casting process.

A feature of the present invention lies in providing a float having an axial bore extending therethrough and in providing a wedge movable between laminations within this bore. A slot in the wall of the bobber communicates with the bore to permit the line to be inserted into the bore without threading the line through the bore. In one position of the wedge the line is freely movable in the bore, while in another position of the wedge the line is locked between the wedge and the bobber body to hold the bobber in adjusted position.

These and other objects and novel features of my invention will be more clearly and fully set forth in the following specification and claims.

In the drawing forming a part of my specification:

Figure 1 is a perspective view of my bobber in position to receive a fish line.

Figure 2 is a perspective view of my bobber showing a fish line locked with respect thereto.

Figure 3 is a vertical section through the bobber showing the construction thereof.

Figure 4 is a perspective view of the bobber body.

Figure 5 is a top plan view of the bobber body.

Figure 6 is a perspective view of the wedge used in conjunction with the bobber body.

The bobber A comprises a body 10 which is illustrated as being of ovoid form with the smaller diameter end thereof designed to comprise the lower end of the body. This body 10 is provided with an axial bore 11 extending therethrough. The bore 11 preferably tapers from a relatively large diameter at the upper end 12 thereof to a relatively smaller diameter at the lower end 13 thereof. A slot 14 extends radially through the body 10, this slot extending longitudinally from top to bottom of the body and communicating with the axial bore 11. The slot 14 is of proper dimension to receive a fish line of substantial size.

The body 10 is provided with a second slot 15 therein which is, in preferred form, a continuation of the slot 14 on the opposite side of the bore 11 from the slot 14. It is not essential that the slot 15 be in opposed relation to the slot 14, but is preferably in this position so that the slots 14 and 15 may be simultaneously formed.

A tapered wedge or peg 16 is slidably supported in the bore 11. The wedge or peg 16 is preferably provided with a multi-sided head 17 and a tapered body including two longitudinally spaced continuously tapered portions 19 and 20. Between the tapered portions 19 and 20 I provide a connecting reduced diameter portion 21 which serves a purpose which will be later described in detail.

The wedge or peg 16 is of such a diameter that when moved into engagement with the bore 11 the head 17 is close to the top of the bobber body. The taper of the bore 11 and the wedge 16 is substantially the same so that the wedge or peg may fit snugly within the bore when urged downwardly into the position shown in Figure 3 of the drawings.

In order to limit slidable movement of the wedge or peg 16 relative to the body 10 I provide a pin or peg 22 extending radially through the body 10 at a point intermediate the top and bottom ends of the body. The pin or peg 22 extends into the bore 11 into proximity with the reduced diameter portion 21 of the peg 16 between the tapered portions 19 and 20 of this wedge. The pin 22 engages against the shoulder 23 formed between the reduced diameter portion 21 and the tapered portion 20 in raised position of the wedge, thus limiting the outward movement. The movement of the wedge in the opposite direction is limited by the engagement of the wedge with the tapering walls of the bore 11, the reduced diameter portion 21 being of sufficient length so that the pin 22 will not restrict downward movement of the wedge 16.

The body 10 may be hollow or may be of solid material of sufficiently light weight to float when resting upon the water. In cases where the body 10 is formed of wood or the like, the outside shape of the body may first be formed, the bore 11 may be formed therein, and the slots 14 and 15 may then be cut in the body. The slots 14 and 15 may be formed by sawing through the body in a radial direction to a depth proper to cut both slots simultaneously. The method of construction of the body is not important in the present invention, however, as various methods may be employed depending upon the type of material which is used.

The wedges or pegs 16 may be formed in any suitable way and of any desired material. When formed of wood, these pegs or pins may be turned to the proper taper and shape from a rectangular strip of wood and when thus formed, it is convenient to employ the construction illustrated. It is possible, however, for me to accomplish a somewhat similar result by forming the body of the wedge continuously tapered and providing a slot in one side of the wedge to receive the inwardly projecting end of the pin 22. The construction illustrated has the advantage that the wedge may be rotated within the bore 11 and has a further advantage in simplicity of assembly.

After formation of the body 10 and the wedge or peg 16, it is only necessary to insert the wedge or peg into the body 10 and to insert the pin 22 to lock the wedge 16 to the body 10. When thus assembled the bobber is in readiness for use.

The operation of my bobber is believed obvious from the previous description. When it is desired to fix the bobber in adjusted position to the fish line B, it is only necessary to insert the fish line into the slot 14 as illustrated in Figure 1 of the drawings until the fish line enters the bore 11. If it is desired to change the position of the bobber relative to the line, it is only necessary to slide the wedge 16 into the position shown in Figure 1 of the drawings, thus releasing the line and sliding the bobber one way or another on the line into the desired position. The wedge 16 may then be forced downwardly to lock the line in place.

When it is desired to cast and to use the bobber as a means of supporting a predetermined length of line, it is only necessary to tie a knot in the fish line at a desired distance from the hook end of the line so that the hook will be suspended at the proper depth below the bobber. The line B is inserted into the slot 14 in the manner shown in Figure 1 and is moved about the bore 11 until it enters the slot 15. This slot is of sufficient size to permit the line to slide relative to the bobber. The wedge 16 is then forced into the body 10 into the position illustrated in Figure 3 of the drawings. As the line is reeled in to the proper extent the bobber A will slide along the line B toward the hook end of the line until the hook, leader, or lure, on the end of the line engages the lower end of the slot. At this time the bobber is close to the hook to facilitate the casting process and the weight of the bobber added to the weight of the hook or lure on the end of the line permits the hook end of the line to be cast in any desired direction. When the float A strikes the surface of the water the line B will slide downwardly through the slot 15 until the knot in the line engages the top of this slot. Further downward movement of the fish line is now impossible and the hook or lure is suspended at the desired distance below the surface of the water.

In accordance with the patent statutes, I have described the principles of construction and operation of my fish line bobber, and while I have endeavored to set forth the best embodiment thereof, I desire to have it understood that obvious changes may be made within the scope of the following claims without departing from the spirit of my invention.

I claim:

1. A fish line bobber comprising a float body having an aperture extending through said body and having a slot communicating with said aperture and having a second slot aligned with said first named slot and extending into the wall of the aperture, said slots being of a size to freely accommodate a fish line, and wedge means in said aperture and designed to snugly fit against the walls thereof in one position.

2. A fish line bobber comprising a float body having an aperture therethrough and having a slot communicating with said aperture and through which a fish line may be inserted into said aperture, the wall of said aperture having a second slot opposite said first named slot, said second slot being of a size to freely receive a fish line, and a wedge in said aperture, and designed to snugly fit the same in one position of the wedge.

HERMAN A. WULFF.

REFERENCES CITED

The following references are of record in the file of this patent:

UNITED STATES PATENTS

| Number | Name | Date |
|---|---|---|
| 928,439 | Garrard | July 20, 1909 |
| 2,162,821 | Parmenter | June 20, 1939 |

FOREIGN PATENTS

| Number | Country | Date |
|---|---|---|
| 15,145 of 1911 | Great Britain | Feb. 1, 1912 |